(12) United States Patent
Gemmati

(10) Patent No.: US 7,946,536 B2
(45) Date of Patent: May 24, 2011

(54) DEVICE FOR INTERCONNECTING FIRST AND SECOND CONTROL STICKS OF AN AIRCRAFT IN ROLL AND IN PITCH

(75) Inventor: Bernard Gemmati, Lauris (FR)

(73) Assignee: Eurocopter (FR)

( * ) Notice: Subject to any disclaimer, the term of this patent is extended or adjusted under 35 U.S.C. 154(b) by 463 days.

(21) Appl. No.: 11/779,332

(22) Filed: Jul. 18, 2007

(65) Prior Publication Data

US 2008/0156940 A1   Jul. 3, 2008

(30) Foreign Application Priority Data

Jul. 18, 2006   (FR) ...................................... 06 06577

(51) Int. Cl.
  *B64C 13/04*   (2006.01)
  *B64C 13/12*   (2006.01)
  *B64C 13/30*   (2006.01)
(52) U.S. Cl. ...................................... 244/229; 244/234
(58) Field of Classification Search .................. 244/229, 244/231, 232, 234, 225, 221, 220, 99.4, 99.3, 244/99.2, 90 R; 434/30, 33, 35, 45; 74/469, 74/471 R; 474/203, 204

See application file for complete search history.

(56) References Cited

U.S. PATENT DOCUMENTS

| 1,820,906 | A | * | 9/1931 | Bowers ........................ 244/229 |
| 2,339,955 | A |   | 1/1944 | Shetler |
| 2,507,600 | A | * | 5/1950 | Kaiser et al. ................ 74/471 R |
| 3,436,130 | A | * | 4/1969 | Grebert .......................... 384/49 |
| 5,149,023 | A |   | 9/1992 | Sakurai et al. |
| 5,488,881 | A | * | 2/1996 | Lin .............................. 474/203 |

FOREIGN PATENT DOCUMENTS

| FR | 563155 | 11/1923 |
| FR | 932659 | 3/1948 |
| WO | 9503212 | 9/1995 |

* cited by examiner

*Primary Examiner* — Tien Dinh
*Assistant Examiner* — Richard R Green
(74) *Attorney, Agent, or Firm* — Brooks Kushman P.C.

(57) ABSTRACT

The present invention relates to a device for interconnecting first and second control sticks (1, 2) for controlling an aircraft in roll and in pitch, the device comprising a pitch interlinking shaft (20) and roll interlinking means (10) respectively for interlinking the first and second control sticks (1, 2) during pitch movements and/or during roll movements. The device is remarkable in that the roll interlinking means (10) are arranged inside the pitch interlinking shaft (20).

20 Claims, 3 Drawing Sheets

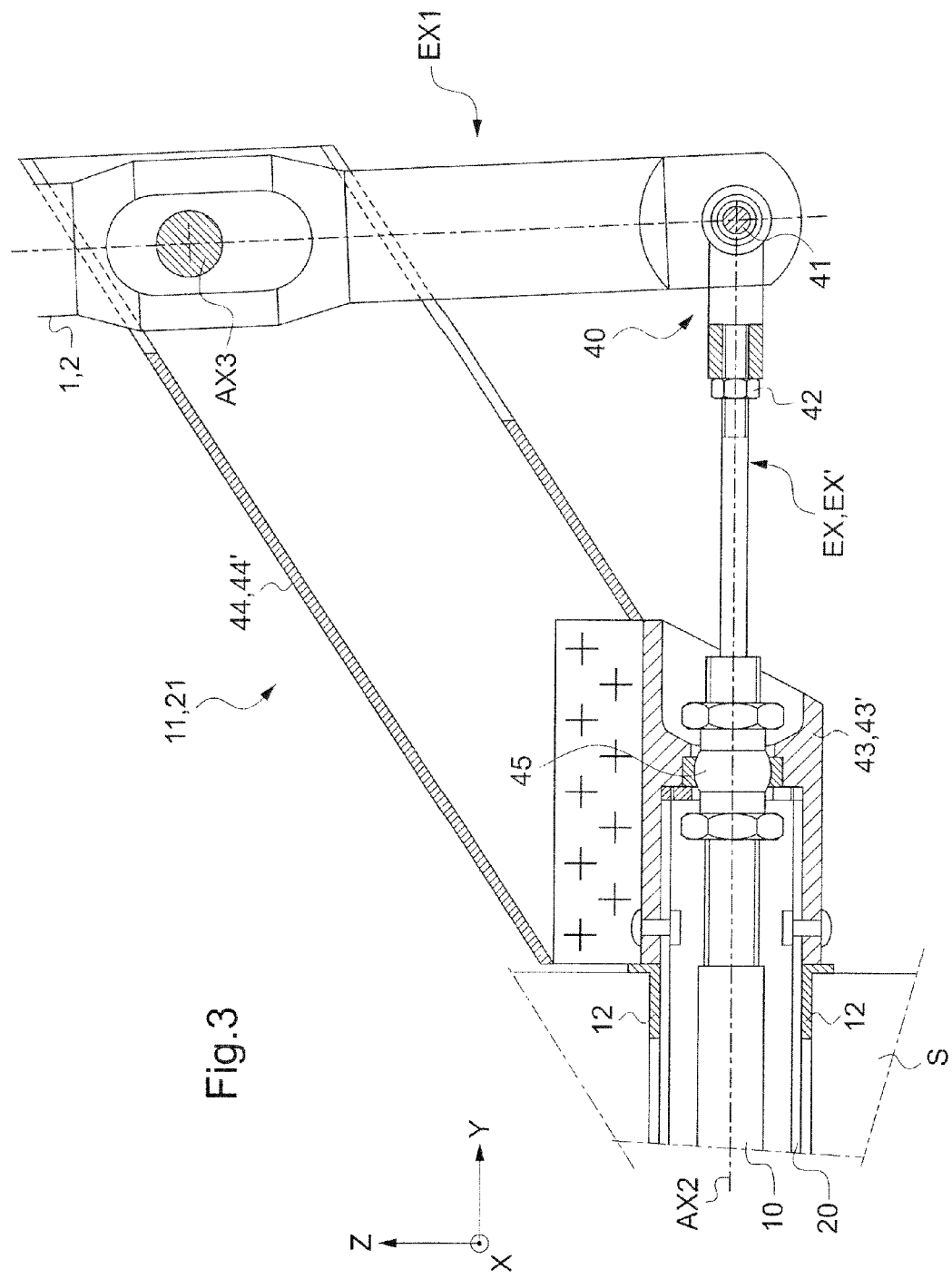

DEVICE FOR INTERCONNECTING FIRST AND SECOND CONTROL STICKS OF AN AIRCRAFT IN ROLL AND IN PITCH

The present invention relates to a device for interconnecting first and second control sticks of an aircraft in roll and in pitch.

BACKGROUND OF THE INVENTION

A pilot controls an aircraft in particular with the help of a control stick that can be moved in roll and/or in pitch, i.e. from left to right and from front to rear, and vice versa.

More particularly, on a helicopter, the control sticks, referred to as "cyclic pitch control sticks" by the person skilled in the art, enable the pilot to control the cyclical variation of the pitch of the blades of the helicopter. By inclining the plane of the helicopter rotor in this way, using the control sticks, the pilot can direct the helicopter in desired manner.

In addition, most aircraft are designed to be controlled by both a pilot and a co-pilot, which requires two control sticks to be used. Naturally, both control sticks must be capable of moving together, and identically, so that either the pilot or the co-pilot is in a position to control the aircraft.

A first device is known that is provided with first and second control sticks. The sticks are interconnected by a roll interlinking shaft and by a pitch interlinking shaft serving respectively to interlink the roll movements and the pitch movements of the control sticks, the pitch interlinking shaft being secured to the structure of the aircraft via bearings.

Thus, the ends of the roll and pitch interlinking shafts are connected to the control sticks via hinges, the pitch interlinking shaft being disposed above the roll interlinking shaft.

Thus, because of said hinges, when the pilot seeks to move the first control stick from front to rear, or vice versa, the first control stick turns the pitch interlinking shaft which in turn moves the second control stick. It should be observed that this movement also has the consequence of moving the roll interlinking shaft through a considerable angle.

If the pilot moves the first control stick from left to right, and vice versa, then the first control stick moves the roll interlinking shaft transversely, thereby transferring the movement of the first control stick to the second control stick.

It is thus easily understood that it is also possible to combine both types of movement.

Although extremely effective, that device occupies a considerable amount of space. It is necessary firstly to secure the pitch interlinking shaft to the structure of the aircraft and then to "cut into" said structure so as to be able to provide the roll interlinking shaft with sufficient space to allow said roll interlinking shaft to sweep through an angle when the control sticks are moved in pitch.

Since the space available in an aircraft is very limited, the overall size of that first device is therefore undesirable.

OBJECTS AND SUMMARY OF THE INVENTION

An object of the present invention is to propose a device that is capable of overcoming the above-mentioned limitations by interconnecting the first and second control sticks of an aircraft while occupying a limited amount of space.

According to the invention, a device for interconnecting first and second control sticks of an aircraft in roll and in pitch comprises first and second control sticks interconnected by a pitch interlinking shaft and a roll interlinking means for interlinking the first and second control sticks respectively during pitch and/or roll movements. The device is remarkable in that the roll interlinking means are arranged inside the pitch interlinking shaft, the roll interlinking means and the pitch interlinking shaft being coaxial, for example. Consequently, they are no longer one above the other, thus making the system much more compact, and no longer requiring a large amount of space to allow the roll interlinking means to sweep through an angle.

In addition, at least one bearing serves to guide the pitch interlinking shaft in turning while also serving to secure said shaft to the structure of the rotorcraft.

In a first variant that is applicable regardless of the embodiment of the invention, the roll interlinking means is a roll interlinking shaft, while in a second variant, said roll interlinking means is a ball control, i.e. a flexible blade guided by two rows of balls inserted in a flexible tube.

Furthermore, the first and second control sticks respectively include first and second connection means that connect them to the roll interlinking means and to the pitch interlinking shaft. By means of these connection means, and of the roll interlinking means and of the pitch interlinking shaft, a roll and/or pitch movement of one control stick entrains an identical movement of the other control stick.

In a first embodiment, each control stick comprises a handle at one end and has a bottom end at the opposite end, the first and second connection means each including a secondary shaft secured to the bottom end of the control stick and provided with primary drive means in rotation.

Preferably, each of the first and second connection means includes secondary drive means connected to a free end of the roll interlinking means, said secondary drive means then cooperating with the primary drive means in such a manner that the control sticks are interconnected in roll.

Advantageously, the secondary shafts of the first and second connection means are mutually parallel and are perpendicular respectively to the first and second control sticks and also to the roll interlinking means. The primary and secondary drive means of the first and second connection means are provided with bevel gears, for example.

Consequently, the first and second control sticks are interlinked in roll via the roll interlinking means and the secondary shaft, the primary drive means, and the secondary drive means of the first and second connection means.

Concerning pitch interlinking, each of the first and second connection means includes a support secured to the pitch interlinking shaft. Thereafter the secondary shaft is connected to said support via a hinge.

This hinge of the support serves firstly to enable the secondary shaft to perform turning movement about a longitudinal axis without entraining said support, and secondly enables the secondary shaft to entrain said support in turning movement about a transverse axis, the longitudinal axis representing a longitudinal axis of symmetry of the secondary shaft directed along the length of said secondary shaft, and the transverse axis representing an axis of symmetry of the pitch interlinking shaft directed along the length of said pitch interlinking shaft. By way of example, such a hinge can be constituted by a ball bearing having its outer cage secured to the support and having its inner cage secured to the secondary shaft.

Finally, in order to optimize the interlinking device, it is advantageous to apply the first variant to this first embodiment.

In a second embodiment, each control stick has a handle at one end and has a bottom end at the opposite end, with the bottom ends of the first and second sticks being connected respectively to first and second free ends of said roll interlinking means via a connection of each connection means.

Advantageously, this connection is provided with rotary means enabling the first and second control sticks to turn about an axis of rotation orthogonal to the roll and pitch interlinking shafts, said rotary means being constituted by a first ball joint, together with adjustment means for adjusting the transverse stroke of each control stick.

Furthermore, the first and second connection means respectively include first and second external abutments that are stationary in translation and that are secured to the pitch interlinking shaft.

In addition, the device is provided with first and second brackets hinged respectively about first and second fastener pins on the first and second control sticks. Consequently, the first and second brackets are secured respectively to the first and second external abutments, said first and second control sticks then being capable respectively of turning the first and second external abutments about their transverse axes of symmetry, and thus of turning the pitch interlinking shaft.

Consequently, on being displaced transversely, the first control stick turns about a first fastener pin and entrains therewith the roll interlinking means, thereby transferring the movement to the second control stick.

In addition, when the stick is pushed or pulled, the bracket is entrained, thereby turning the pitch interlinking shaft so that the movement is transferred to the second control stick.

Finally, a second ball joint is advantageously arranged between each external abutment and the roll interlinking means when the second above-mentioned variant is advantageously applied to the second embodiment in order to limit the overall size of the device.

BRIEF DESCRIPTION OF THE DRAWINGS

The invention and its advantages appear in greater detail in the following description that relates to preferred embodiments given without any limiting character and with reference to the accompanying figures, in which:

FIG. 3 is a fragmentary section of the invention in its second embodiment.

MORE DETAILED DESCRIPTION

Elements present in more than one of the figures are given the same references in all of them.

The figures show three mutually orthogonal axes of directions X, Y, and Z.

The X direction axis extends lengthwise relative to the aircraft on which the device of the invention is arranged. The terms "front/rear" and "longitudinal" relate thereto.

The Y direction axis is directed width-wise relative to the aircraft. The terms "left/right" and "transverse" relate thereto.

The Z direction axis is referred to as elevation. It is directed in the height direction of the aircraft.

The X and Y directions together define an X, Y plane referred to as a main plane, within which the support polygon of the aircraft is inscribed.

Figure 1:
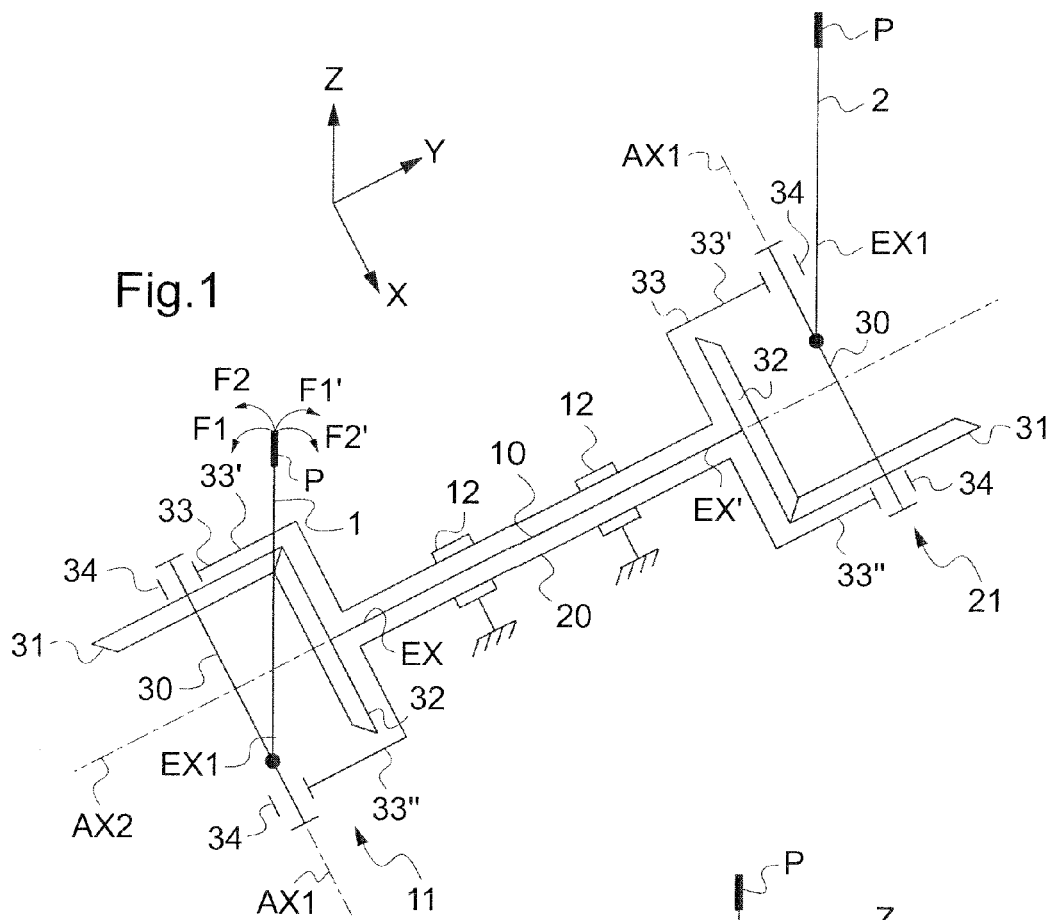
FIG. 1 is a diagrammatic view of the invention in a first embodiment.
Figure 2:
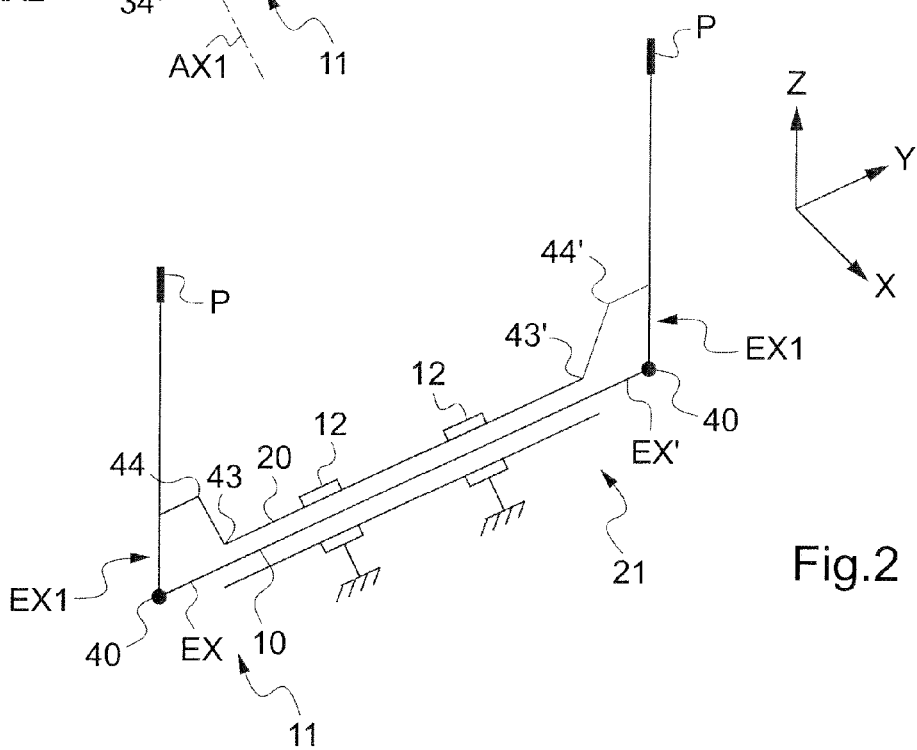
FIG. 2 is a diagrammatic view of the invention in a second embodiment.
Figure 4A:
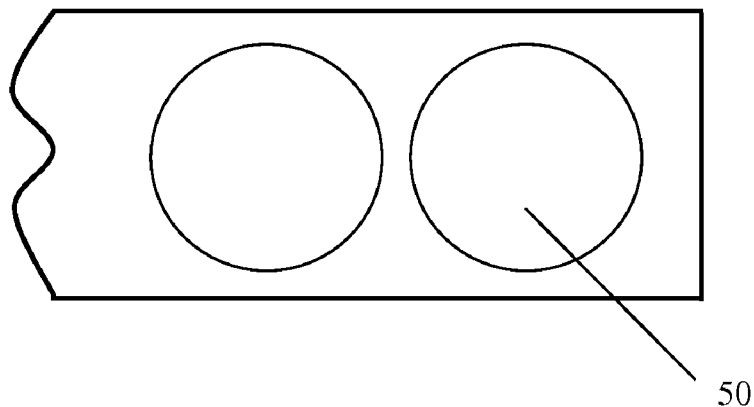
FIGS. 4A and 4B are views of a ball control including a roll of balls 50 and a flexible blade 52.
Figure 4B:
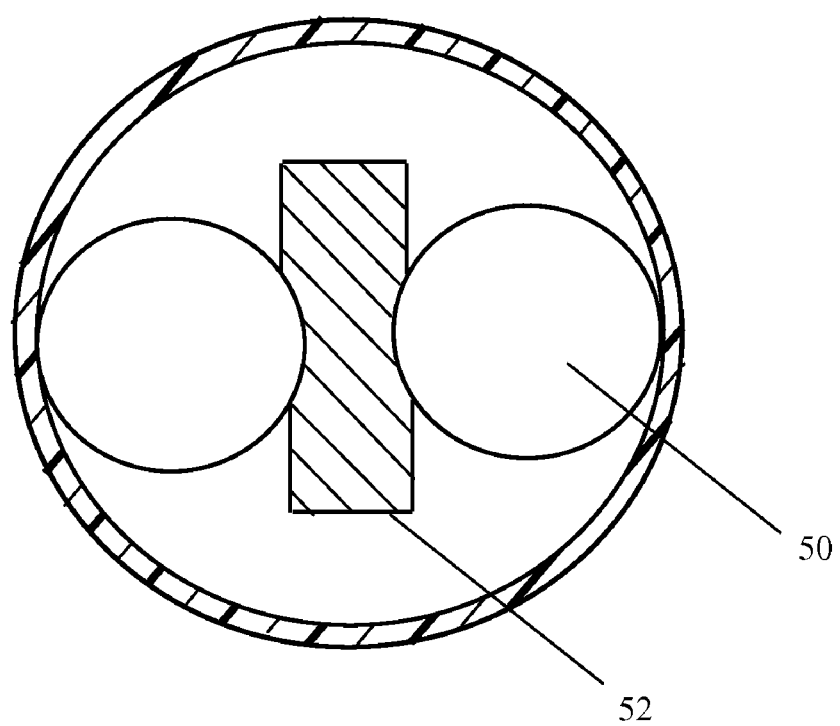

With reference to FIGS. 1 and 2 relating respectively to first and second embodiments of the invention, the present invention seeks in particular to link first and second aircraft control sticks 1 and 2 so that these two control sticks 1 and 2 move identically when either one of the control sticks is moved by the pilot or by the co-pilot of the aircraft.

The first and second control sticks 1 and 2 are interlinked in roll, i.e. in the direction of arrows F1, F1' with a transverse left-to-right or right-to-left movement, via roll interlinking means 10, i.e. a roll interlinking shaft or a ball control, for example, depending on the variant implemented. In the same manner, the first and second control sticks 1 and 2 are interlinked in aircraft pitch, i.e. along arrows F2, F2' in longitudinal front-to-rear and rear-to-front movement, via a pitch interlinking shaft 20. Consequently, the first and second control sticks 1 and 2 are connected to the roll interlinking means 10 and to the pitch interlinking shaft 20 respectively via first and second connection means 11 and 21.

Advantageously, the roll interlinking means 10 are arranged inside the pitch interlinking shaft 20, thus making it possible to reduce considerably the size of the device. Similarly, the roll interlinking means 10 and said pitch interlinking shaft 20 are coaxial and directed along the same Y direction axis.

It should be observed that the pilot and the co-pilot are sometimes situated one behind the other and not one beside the other. In such a configuration, the roll interlinking means 10 and the pitch interlinking shaft 20 are then directed along the X direction axis.

Furthermore, to enable the device to be secured to the aircraft on which it is arranged, at least one bearing 12, and two such bearings of FIGS. 1 and 2, surround the pitch interlinking shaft 20. These bearings secure the pitch interlinking shaft 20 to the aircraft while guiding it pivoting about its transverse axis of symmetry AX2, said transverse axis AX2 being directed along the length of the pitch interlinking shaft 20. Similarly, the bearings 12 prevent the pitch interlinking shaft 20 from moving along one of the direction axes, with pivoting thereof about its transverse axis of symmetry AX2 then being the only movement allowed for the pitch interlinking shaft 20.

Furthermore, since the roll interlinking means 10 and the pitch interlinking shaft 20 are coaxial, said transverse axis AX2 is also an axis of symmetry for the roll interlinking means 10 directed along the length of said shaft 20.

More specifically, FIG. 1 is a diagrammatic view of a first embodiment of the invention.

Each of the first and second control sticks 1 and 2 has a handle P at one end that is held by the pilot and/or the co-pilot for moving the control stick, and has a bottom to the opposite end EX1, i.e. an end closest to the roll interlinking means 10 and to the pitch interlinking shaft 20.

In addition, the bottom ends of the first and second control sticks 1 and 2 are not arranged on the transverse axis of symmetry AX2 of the roll interlinking means 10 and of the pitch interlinking shaft 20, but are offset relative to said transverse axis AX2, the first control stick 1 being in front of the transverse axis AX2 along the X direction axis, while the second control stick 2 is behind the transverse axis AX2 along the X direction axis. Naturally, the converse configuration could be envisaged, and it is also possible for the control sticks 1, 2 to be arranged on the transverse axis AX2.

Furthermore, the bottom ends EX1 of the first and second control sticks 1 and 2 are secured to respective secondary shafts 30, the secondary shafts 30 of the first and second connection means 11 and 21 being parallel to each other and perpendicular to the first and second sticks 1 and 2 to which they are secured.

Furthermore, each secondary shaft 30 of the first and second connection means 11 and 21 includes primary drive means 31 in rotation co-operating with secondary drive means 32 arranged at a free end EX, EX' of the roll interlinking means.

Consequently, if the pilot moves the first control stick 1 in the direction of arrow F1, the secondary shaft 30 of the first connection means 11 turns about its longitudinal axis of symmetry AX1, i.e. the axis of symmetry of the secondary shaft 30 extending along the length of said secondary shaft 30, thereby entraining the primary drive means 31 constituted by a bevel gear in FIG. 1.

The primary drive means 31 of the first connection means 11 causes the secondary drive means 32 of the first connection means 11, likewise a bevel gear, to turn, which secondary drive means is arranged at a first free end EX of the roll interlinking means 10. Consequently, the secondary drive means 32 causes the roll interlinking means 10 to turn about its transverse axis of symmetry AX2.

Given the structure of the device, and the symmetry of the first and second connection means 11 and 21, the roll interlinking means enable the second control stick 2 to perform the same roll movement as the first stick 1, successively via the secondary drive means 32, arranged at the second free end EX' of the roll interlinking means 10, and the primary drive means 31, and the secondary shaft 30 of the second connection means 21.

The first and second control sticks 1 and 2 are thus interlinked in roll via the following transmission system:
the first control stick 1;
the secondary shaft 30 of the first connection means 11 secured to the first control stick 1;
the primary drive means 31 of the first connection means 11;
the secondary drive means 32 of the first connection means 11 that is arranged at a first free end EX of the roll interlinking means 10;
the roll interlinking means 10;
the secondary drive means 32 of the second connection means 21 arranged at the second free end EX' of the roll interlinking means 10;
the primary drive means 31 of the second connection means 21;
the secondary shaft 30 of the second connection means 21 secured to the second control stick 2; and
the second control stick 2.

In addition, concerning pitch interlinking, each of the first and second connection means 11 and 21 includes a support 33 that is secured to one end of the pitch interlinking shaft 20.

In addition, each support 33 is provided with at least one hinge 34, and preferably two hinges per support secured at each end zone of the secondary shaft 30 in the embodiment of FIG. 1. Each support includes two angled links 33', 33" going round the secondary drive means 32, each angled link 33', 33" then being provided with a hinge 34.

These hinges 34, e.g. constituted by ball bearings, have an outer cage secured to the support 33, and more particularly to one of the angled links 33', 33", and have an inner cage surrounding the secondary shaft 30, enabling each secondary shaft firstly to turn about its own longitudinal axis of symmetry AX1, and secondly to drive a support 33 to turn about a transverse axis AX2 of symmetry of the pitch interlinking shaft 20.

The system for transmitting pitch movement thus comprises in succession:
the first control stick 1;
the secondary shaft 30 of the first connection means 11 secured to the first control stick 1;
the support 33 of the first connection means 11;
the pitch interlinking shaft 20;
the support 33 of the second connection means 21;
the secondary shaft 30 of the second connection means 21 secured to the second control stick 2; and
the second control stick 2.

Finally, in order to hold all of the elements of the device together, it is possible to envisage providing one or more ball joints between the roll interlinking means 10 and the pitch interlinking shaft 20 so as to avoid any displacement either longitudinally or in elevation of the roll interlinking means 10, for example.

In addition, given the way in which the first embodiment operates, the interlinking device is optimized by applying the first variant thereto, the roll interlinking means then comprising a roll interlinking shaft.

FIGS. 2 and 3 show a second embodiment of the invention, in which the bottom ends EX1 of the first and second sticks 1 and 2 are arranged on the transverse axis of symmetry AX2 of the roll and pitch interlinking shafts 10 and 20.

Each of the first and second connection means 11 and 21 have a connection 40 serving respectively to connect the bottom ends EX1 of the first and second sticks 1 and 2 to the first and second free ends EX and EX' of the roll interlinking means. These connections provide roll interlinking for the first and second control sticks 1 and 2.

For pitch interlinking, the first and second connection means 11 and 21 are respectively provided with first and second brackets 44 and 44', each bracket 44, 44' being hinged at one end on a control stick 1, 2 and constrained to turn with the pitch interlinking shaft 20.

FIG. 3 is a section through one of the connection means 11, 21 in a second embodiment. It can readily be understood that the first and second connection means are identical in structure.

The pitch interlinking shaft 20 is secured to the structure S of the aircraft via at least one bearing 12 that provides said pitch interlinking shaft 20 with guidance in turning about its transverse axis of symmetry AX2. In addition, the bearing 12 prevents any other movement of the pitch interlinking shaft 20, and in particular prevents any movement in translation along the transverse axis AX2.

Furthermore, the pitch interlinking shaft 20 is constrained to turn with the first and second control sticks 1 and 2 about the transverse axis AX2.

Consequently, the first and second connection means 11 and 21 include respective first and second external abutments 43, 43'. These external abutments 43, 43' are secured to the free ends EX, EX' of the pitch interlinking shaft 20 by conventional means, e.g. by screws, and can therefore turn about the transverse axis AX2. Nevertheless, like the pitch interlinking shaft 20, the external abutments 43, 43' are prevented from performing any other type of movement, e.g. movement in translation along the transverse axis AX2.

Furthermore, each external abutment 43, 43' is connected to a control stick 1, 2 via a bracket 44, 44' that is hinged on said control stick 1, 2 about a fastener pin AX3.

More precisely, the first external abutment 43 of the first connection means 11 is secured to the first free end EX of the pitch interlinking shaft 20, while being connected to the first fastener pin AX3 of the first control stick 1 by the first bracket 44. Similarly, the second outer abutment 43' of the second connection means 21 is secured to the second free end EX' of the pitch interlinking shaft 20, while being connected to the second fastener pin AX3 of the second control stick 2 by the second bracket 44'.

When the pilot pushes the first control stick 1 so that it performs pitch movement along arrow F2, for example, the first control stick 1 turns the first bracket 44 about the transverse axis AX2 and consequently turns the first external abutment 43. The pitch interlinking shaft is thus also caused to turn, thereby moving the second control stick 2 via the second external abutment 43' and the second bracket 44'.

Furthermore, the roll interlinking means 10 are inserted inside the pitch interlinking shaft 20 so as to limit the overall size of the assembly.

In order to have the first and second control sticks 1 and 2 properly interlinked in roll, these control sticks 1 and 2 have respective connections 40 at their bottom ends EX1. The connections 40 are advantageously provided with respective first ball joints 41 and adjustment means 42, e.g. a threaded rod and a nut.

When the pilot controls the aircraft by tilting the first control stick 1 to roll to the left, along arrow F1, then the first control stick 1 tilts about its fastener pin AX3 insofar as the first bracket 44 is fastened to a first external abutment 43 that is prevented from moving in translation along the transverse axis AX2.

In a first variant of this second embodiment, the roll interlinking means 10 is constituted by a roll interlinking shaft.

The bottom end EX1 of the first control stick 1 then pushes said roll interlinking means 10 which moves along the transverse axis of symmetry AX2 of the roll interlinking means 10 and of the pitch interlinking shaft 20.

By means of this movement in translation, the roll interlinking shaft 10 moves the bottom end EX1 of the second control stick 2 transversely, thereby causing it to perform a roll movement to the left identical to the movement of the first control stick 1.

In a second variant of this second embodiment, the roll interlinking means 10 is a ball control comprising a flexible blade arranged between two rows of balls, the rows of balls themselves being secured to a flexible tube surrounding both the balls and the flexible blade.

Advantageously, a second ball joint 45 is disposed between each external abutment 43, 43' and the flexible blade of the roll interlinking means 10. In this way, the pitch interlinking shaft 20 can perform turning movement about the transverse axis AX2 without entraining therewith the roll interlinking means 10.

The second ball joint 45 represents stationary points about which the ball control curves. When the handle P of the first control stick 1 is moved along arrow F1, the first end EX1 of the first control stick 1 pushes the flexible blade of the ball control, said flexible blade then moving along the transverse axis of symmetry AX2.

Consequently, the flexible blade pushes the second end EX2 of the second control stick 2, thereby causing it to reproduce the roll movement of the first control stick 1.

It should also be observed that the tube and the ball control balls are blocked between the two second ball joints 45, the flexible blade passing through each of the inner cages of said second ball joints 45.

Consequently, during a roll movement of the first and second control sticks 1, 2, the ball control becomes slightly curved. Thus, it does not move in elevation, in particular at the second ball joints, thereby significantly limiting the overall size of the device.

Naturally, the present invention can be implemented in a wide variety of ways. Although a plurality of embodiments are described above, it will readily be understood that it is not conceivable to identify exhaustively all possible embodiments. Naturally, it is possible to envisage replacing any of the means described by equivalent means without thereby going beyond the ambit of the present invention.

What is claimed is:

1. A device for interconnecting first and second control sticks in roll and in pitch, said device comprising:
    first and second control sticks;
    a pitch interlinking shaft; and
    roll interlinking means arranged inside said pitch interlinking shaft, said roll interlinking means interconnecting said first and second control sticks,
    wherein the first and second control sticks include first and second connection means, the first connection means connecting the first control stick to the roll interlinking means and the pitch interlinking shaft, and the second connection means connecting the second control stick to the roll interlinking means and the pitch interlinking shaft, with a movement in roll and/or in pitch of one of the control sticks entraining an identical movement of the other stick;
    wherein the pitch interlinking shaft rotates to entrain movement of the other stick.

2. The device according to claim 1, wherein said roll interlinking means and said pitch interlinking shaft are coaxial.

3. The device according to claim 1, wherein at least one bearing serves to guide the pitch interlinking shaft in turning.

4. The device according to claim 1, wherein said roll interlinking means is a roll interlinking shaft.

5. The device according to claim 4, wherein each control stick comprises:
    a handle at one end of the control stick; and
    a bottom end at an opposite end of the control stick,
    said first and second connection means each including a secondary shaft secured to said bottom end and provided with primary drive means in rotation.

6. The device according to claim 5, wherein said secondary shafts of the first and second connection means are mutually parallel, and the secondary shafts are perpendicular respectively to the first and second control sticks.

7. The device according to claim 5, wherein each of the first and second connection means includes:
    secondary drive means connected to a free end of said roll interlinking means, said secondary drive means co-operating with said primary drive means in such a manner as to cause said control sticks to be interconnected in roll.

8. The device according to claim 5, wherein each of the first and second connection means includes:
    a support secured to said pitch interlinking shaft; and
    a hinge connecting said secondary shaft to the support, said hinge serving firstly to enable the secondary shaft to perform turning movement about its longitudinal axis without entraining said support, and secondly to enable the secondary shaft to entrain said support to turn about a transverse axis, the longitudinal axis representing a longitudinal axis of symmetry of the secondary shaft directed along the length of said secondary shaft (30), and the transverse axis representing an axis of symmetry of the pitch interlinking shaft directed along the length of said pitch interlinking shaft.

9. The device according to claim 1, wherein said roll interlinking means is a ball control comprising:
    a flexible blade guided by two rows of balls inserted in a flexible tube.

10. The device according to claim 1, wherein each control stick has:
    a handle at one end; and
    a bottom end at the opposite end, said bottom ends of the first and second control sticks being connected respectively to first and second free ends of said roll interlinking means via a connection of each connection means.

11. The device according to claim 10, wherein said connection is provided with:
   a ball joint; and
   adjustment means for properly interlinking the first control stick and the second control stick in roll.

12. The device according to claim 10, wherein the first and second connection means include:
   respective first and second external abutments secured to the respective first and second free ends of the pitch interlinking shaft, and the first and second external abutments are prevented from moving in translation.

13. The device according to claim 12, the device being provided with:
   first and second brackets hinged respectively about first and second fastener pins on said first and second control sticks, said first and second brackets being secured respectively to the first and second external abutments, said first and second sticks being capable respectively of entraining the first and second external abutments to turn about said roll interlinking means.

14. The device according to claim 12, wherein said roll interlinking means being constituted by:
   a ball control; and
   a ball joint is arranged between each external abutment (43, 43') and said roll interlinking means.

15. A device for interconnecting first and second control sticks in roll and in pitch, said device comprising:
   first and second control sticks;
   a pitch interlinking shaft; and
   a roll interlinker that is a roll interlinking shaft arranged inside said pitch interlinking shaft, said roll interlinker interconnecting said first and second control sticks,
   wherein the first and second control sticks include first and second connection means, the first connection means connecting the first control stick to the roll interlinker and the pitch interlinking shaft, and the second connection means connecting the second control stick to the roll interlinker and the pitch interlinking shaft, with a movement in roll and/or in pitch of one of the control sticks entraining an identical movement of the other stick;
   wherein the pitch interlinking shaft rotates to entrain movement of the other stick.

16. The device according to claim 15, wherein said roll interlinker and said pitch interlinking shaft are coaxial.

17. The device according to claim 15, wherein at least one bearing serves to guide the pitch interlinking shaft in turning.

18. A device for interconnecting first and second control sticks (1, 2) in roll and in pitch, said device comprising:
   first and second control sticks;
   a pitch interlinking shaft; and
   a roll interlinker that is a ball control formed from a flexible blade guided by two rows of balls inserted in a flexible tube, the roll interlinker being arranged inside said pitch interlinking shaft, said roll interlinking means interconnecting said first and second control sticks,
   wherein the first and second control sticks include first and second connection means, the first connection means connecting the first control stick to the roll interlinker and the pitch interlinking shaft, and the second connection means connecting the second control stick to the roll interlinker and the pitch interlinking shaft, with a movement in roll and/or in pitch of one of the control sticks entraining an identical movement of the other stick.

19. The device according to claim 18, wherein said roll interlinker and said pitch interlinking shaft are coaxial.

20. The device according to claim 18, wherein at least one bearing serves to guide the pitch interlinking shaft in turning.

* * * * *